US010961961B2

(12) United States Patent
Watanabe et al.

(10) Patent No.: US 10,961,961 B2
(45) Date of Patent: Mar. 30, 2021

(54) CONTROL METHOD OF HIGH-PRESSURE FUEL SUPPLY PUMP AND HIGH-PRESSURE FUEL SUPPLY PUMP USING THE SAME

(71) Applicant: Hitachi Automotive Systems, Ltd., Hitachinaka (JP)

(72) Inventors: Masanori Watanabe, Tokyo (JP); Shunsuke Aritomi, Tokyo (JP); Kenichiro Tokuo, Hitachinaka (JP); Masayuki Suganami, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 354 days.

(21) Appl. No.: 15/775,944

(22) PCT Filed: Nov. 7, 2016

(86) PCT No.: PCT/JP2016/082902
§ 371 (c)(1),
(2) Date: May 14, 2018

(87) PCT Pub. No.: WO2017/110269
PCT Pub. Date: Jun. 29, 2017

(65) Prior Publication Data
US 2019/0234359 A1    Aug. 1, 2019

(30) Foreign Application Priority Data

Dec. 25, 2015    (JP) .............................. JP2015-252809

(51) Int. Cl.
*F02M 59/36* (2006.01)
*F02M 63/00* (2006.01)
(Continued)

(52) U.S. Cl.
CPC ........... *F02M 59/368* (2013.01); *F02D 41/20* (2013.01); *F02M 59/466* (2013.01);
(Continued)

(58) Field of Classification Search
CPC ......... F02M 63/0015–63/0024; F02M 59/466; F02D 2041/2003; F02D 2041/2037;
(Continued)

(56) References Cited

U.S. PATENT DOCUMENTS

| 2011/0288748 A1 | 11/2011 | Richter et al. |
| 2012/0118271 A1* | 5/2012 | Borg ........................ F02D 41/20 123/495 |

(Continued)

FOREIGN PATENT DOCUMENTS

| JP | 2012-511658 A | 5/2012 |
| JP | 2013-32750 A | 2/2013 |

(Continued)

OTHER PUBLICATIONS

International Search Report (PCT/ISA/210) issued in PCT Application No. PCT/JP2016/082902 dated Jan. 24, 2017 with English-language translation (Five (5) pages).

(Continued)

*Primary Examiner* — Bryan M Lettman
(74) *Attorney, Agent, or Firm* — Crowell & Moring LLP

(57) ABSTRACT

A control method of a fuel supply pump includes moving an anchor in the closing valve direction by passing a maximum drive current through the solenoid, and thereafter holding the anchor at a closing valve position by passing a holding current for keeping a closing valve state through the solenoid. The holding current is smaller than the maximum drive current. A current value of a first drive current is smaller than a current value of the holding current. A current value of a second drive current overlaps a range of the current value of the holding current. A current value of a third driving current is equal to or more than the current value of the holding current.

7 Claims, 8 Drawing Sheets

(51) Int. Cl.
　　　*F02D 41/20*　　　(2006.01)
　　　*F02M 59/46*　　　(2006.01)
(52) U.S. Cl.
　　　CPC . *F02M 63/0022* (2013.01); *F02D 2041/2037* (2013.01); *F02D 2041/2044* (2013.01)
(58) Field of Classification Search
　　　CPC ..... F02D 2041/2044; F02D 2041/2048; F02D 41/20; F04B 7/0076
　　　See application file for complete search history.

(56) References Cited

U.S. PATENT DOCUMENTS

| | | | |
|---|---|---|---|
| 2013/0032212 A1* | 2/2013 | Tokuo | F04B 7/0053 137/1 |
| 2014/0196691 A1 | 7/2014 | Klesse et al. | |
| 2015/0090227 A1* | 4/2015 | Pursifull | F02M 39/00 123/446 |
| 2016/0160790 A1* | 6/2016 | Pursifull | F02D 41/3845 123/294 |
| 2016/0186707 A1* | 6/2016 | Sakamoto | F02M 59/464 417/505 |

FOREIGN PATENT DOCUMENTS

| | | |
|---|---|---|
| JP | 2014-134208 A | 7/2014 |
| JP | 2014-145339 A | 8/2014 |
| JP | 2015-21428 A | 2/2015 |

OTHER PUBLICATIONS

Japanese-language Written Opinion (PCT/ISA/237) issued in PCT Application No. PCT/JP2016/082902 dated Jan. 24, 2017 (Four (4) pages).

\* cited by examiner

CONTROL METHOD OF HIGH-PRESSURE FUEL SUPPLY PUMP AND HIGH-PRESSURE FUEL SUPPLY PUMP USING THE SAME

TECHNICAL FIELD

The present invention relates to a high-pressure fuel supply pump used in an internal combustion engine.

BACKGROUND ART

In recent years, the need for quietness of high-pressure fuel supply pumps is increasing from the viewpoint of improving comfort. Various inventions have been made concerning the reduction of noises of high-pressure fuel supply pumps. The methods of reducing noises are broadly classified into those based on structural change and those based on control. According to the latter control, the following invention is disclosed as a technique concerning reduction of noises of a collision sound generated at the time of opening and closing of a valve by controlling a current to a solenoid valve.

CITATION LIST

Patent Literature

PTL 1: JP 2015-21428 A
PTL 2: JP 2012-511658 A

SUMMARY OF INVENTION

Technical Problem

In JP 2015-21428 A (PTL 1), after the valve opening operation of the solenoid valve is started and the solenoid valve is opened, the energization to the solenoid is temporarily stopped, and the solenoid is temporarily re-energized before the solenoid valve is completely opened. In JP 2012-511658 A (PTL 2), immediately after the plunger has exceeded the top dead center, energization to the solenoid of the solenoid valve is terminated once, and thereafter, immediately before the tappet strikes the stopper, the current pulse is applied for braking. However, in these inventions, since the shape of the applied current waveform and the like are not specifically described, depending on the application timing and magnitude of the current value, the solenoid valve may not be held open or the desired braking effect may not be obtained in some cases.

The present invention has been improved in view of these points, and the main purpose of the present invention is to reduce the collision sound generated when the solenoid valve is opened.

Solution to Problem

A high-pressure fuel supply pump according to the present invention for realizing the above object can be realized with, for example, in a control method of a high-pressure fuel supply pump including a suction valve disposed on the suction side of the pressurizing chamber, a rod unit for urging the suction valve toward the opening valve direction, and an anchor unit for moving the rod unit in the closing valve direction with attraction by magnetic attraction caused by a solenoid being energized, when the anchor unit moves in the opening valve direction, a first drive current is passed through the solenoid for a predetermined period of time, and thereafter a second drive current larger than the first drive current is passed through the solenoid for a predetermined period of time.

Advantageous Effects of Invention

According to the present invention, a control method and a high-pressure fuel supply pump capable of reducing the collision sound generated when the solenoid valve is opened can be provided.

The problems, configurations, and effects other than those described above will be understood from the description of the embodiments below.

DESCRIPTION OF EMBODIMENTS

Figure 1:
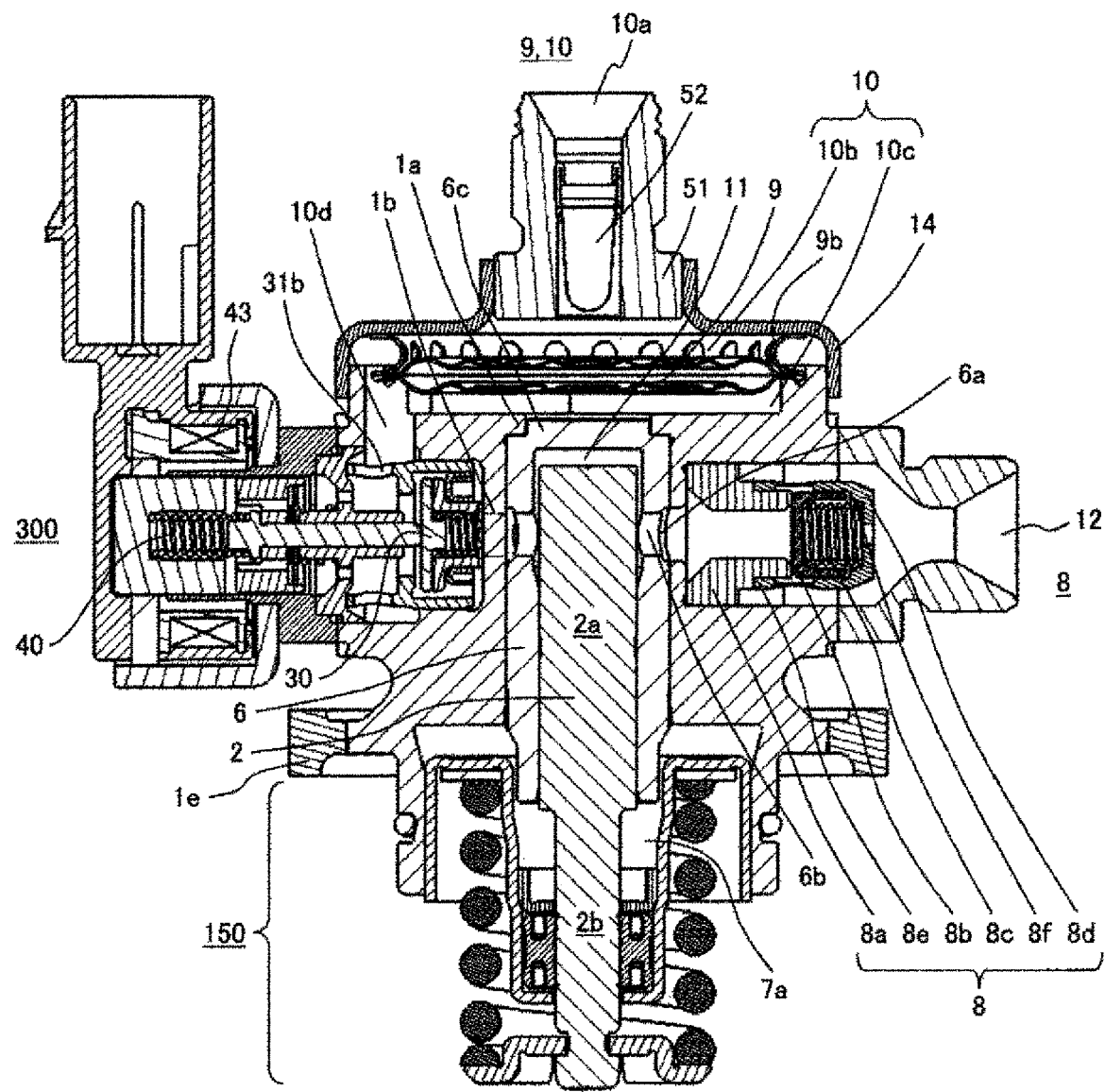
FIG. 1 is an overall longitudinal sectional view of a high-pressure fuel supply pump according to a first embodiment of the present invention.

Hereinafter, embodiments according to the present invention will be described.

In a high-pressure fuel supply pump having a solenoid valve with a movable unit moving by magnetic attraction, the movable unit is constituted by an anchor unit and a rod inserted through the anchor unit, and the anchor unit is constituted by a magnetic path forming unit formed at an outer circumference side of the anchor unit and forming a magnetic path and a guide unit formed on the inner periphery side of the anchor unit and having hardness higher than that of the magnetic path forming unit to guide a sliding surface with the rod.

The anchor unit is formed by the magnetic path forming unit forming the magnetic path, i.e., affecting magnetic attraction property and the guide unit not affecting the magnetic path and forming the sliding unit with the rod, and the hardness is increased by applying the heat treatment and the like to only the guide unit, so that the wear resistance of the sliding unit can be improved without lowering the magnetic property.

When the movable unit strikes a fixed core 39, the movement of the anchor unit stops but since the rod continues to move, the collision mass is reduced by the mass thereof. As a result, the collision load decreases, and the collision sound can be reduced.

Further, the magnetic path forming unit and the guide unit may be formed by separate members, respectively, and may be combined to form an anchor unit. In this case, the magnetic path forming unit may be formed of a magnetic material having a higher magnetic property than the guide unit, and the guide unit may be formed of a hardened material having higher hardness than the magnetic path forming unit.

The magnetic path forming unit and the guide unit are formed as separate members, and the ease of process, heat treatment, and surface treatment can be improved by using the magnetic material for the magnetic path forming unit and the high hardness material for the guide unit according to their functions. As a method for improving the hardness of guide unit, heat treatment such as quenching treatment and surface treatment such as plating treatment may be used.

Further, parts having the function of contacting other members, such as a contact unit with a rod, a spring receiving unit of an anchor unit urging spring for urging the anchor unit, and a stopper unit for regulating movement of the anchor unit, are aggregated in the guide unit with high hardness, so that it is possible to simultaneously improve their abrasion resistance.

In addition, a through hole is formed to hydraulically connect the front and rear of the anchor unit to the guide unit, so that, without reducing the cross-sectional area of the magnetic path, it is possible to form a breathing hole for releasing excluded volume necessary for the anchor unit operation and to prevent the magnetic attraction from decreasing.

Embodiments of the present invention will be described below with reference to the figures.

First Embodiment

Figure 2:
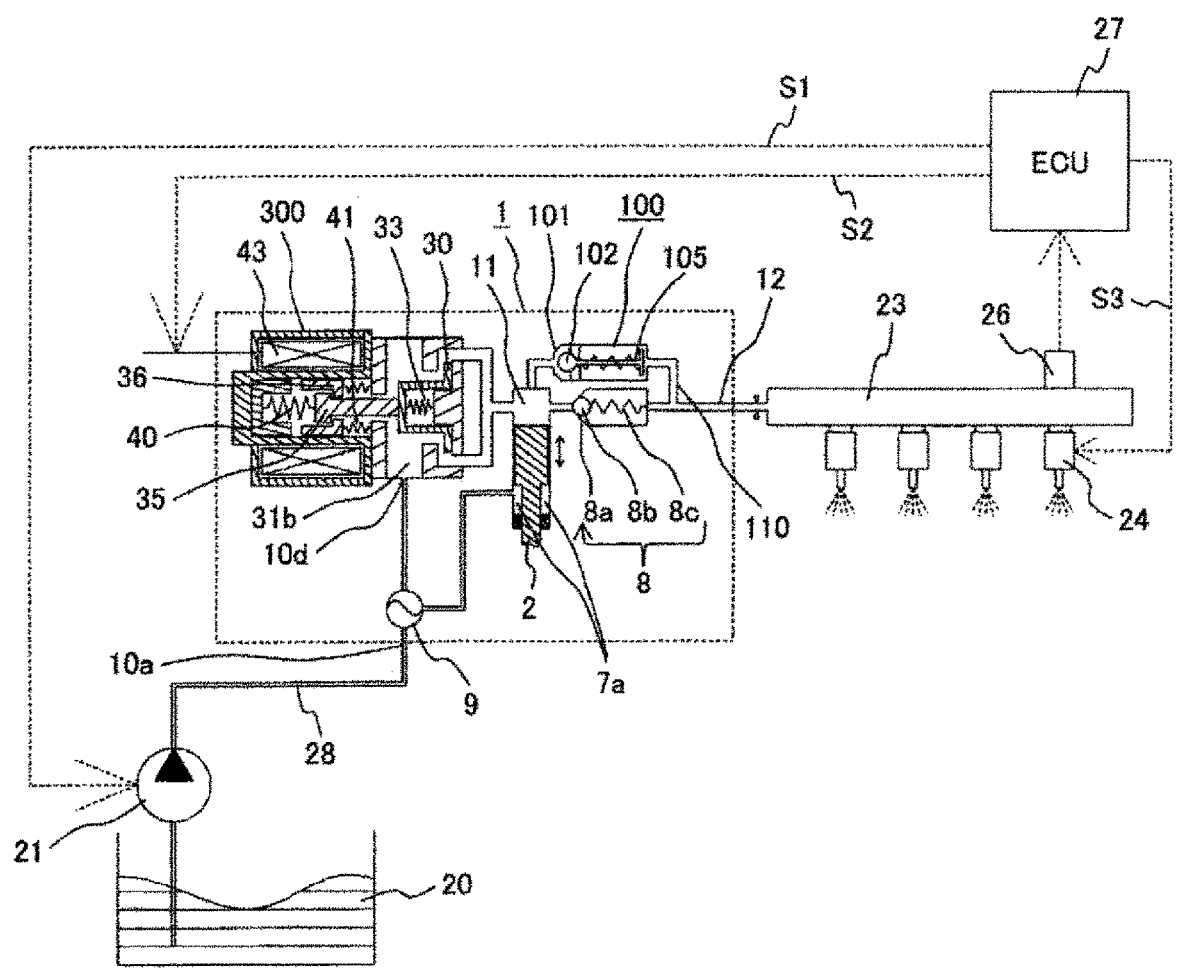
FIG. 2 is an overall configuration of the high-pressure fuel supply pump according to the first embodiment of the present invention.

FIG. 2 is a diagram showing an example of overall configuration of a fuel supply system including a high-pressure fuel supply pump to which the present invention can be applied. First, the configuration and operation of the entire system will be described using this figure.

In FIG. 2, a portion 1 surrounded by a broken line shows a high-pressure fuel supply pump main body, and it is shown that the mechanism and parts shown in this broken line are integrated into the high-pressure fuel supply pump main body 1. In the high-pressure fuel supply pump main body 1, fuel is fed from the fuel tank 20 via a feed pump 21. The pressurized fuel is fed from the high-pressure fuel supply pump main body 1 to an injector 24. The engine control unit 27 takes in the pressure of the fuel from the pressure sensor 26 and controls the feed pump 21, an electromagnetic coil 43, and the injector 24 in the high-pressure fuel supply pump main body 1 so as to optimize the pressure.

In FIG. 2, the fuel in the fuel tank 20 is pumped up by the feed pump 21 based on the control signal S1 from the engine control unit 27, and is pressurized to an appropriate feed pressure, and is supplied through a suction pipe 28 to a low-pressure fuel suction port (suction joint) 10a of the high-pressure fuel supply pump 1. The fuel that has passed through the low-pressure fuel suction port 10a reaches the suction port 31b of the electromagnetic suction valve 300 constituting the capacity variable mechanism via a pressure pulsation reduction mechanism 9 and a suction passage 10d. In addition, the pressure pulsation reduction mechanism 9 is in communication with an annular low-pressure fuel chamber 7a, which makes the pressure variable in conjunction with a plunger 2 performing the reciprocating motion by a cam mechanism (not shown) of the engine, so that the pulsation of the fuel pressure for suction into the suction port 31b of the electromagnetic suction valve 300 is reduced.

The fuel flowing into the suction port 31b of the electromagnetic suction valve 300 passes through the suction valve 30 and flows into the pressurizing chamber 11. The valve position of the suction valve 30 is determined by controlling the electromagnetic coil 43 in the high-pressure fuel supply pump main body 1 based on a control signal S2 from the engine control unit 27. In the pressurizing chamber 11, a power for reciprocating movement of the plunger 2 is given by a cam mechanism (not shown) of the engine. In a descending step of the plunger 2, fuel is suctioned from the suction valve 30 by the reciprocating motion of the plunger 2, and suctioned fuel is pressurized in an ascending step of the plunger 2, and fuel is pumped through the discharge valve mechanism 8 to the common rail 23 on which the pressure sensor 26 is mounted. Thereafter, based on the control signal S3 from the engine control unit 27, the injector 24 injects fuel to the engine.

The discharge valve mechanism 8 provided in the exit of the pressurizing chamber 11 includes a discharge valve seat 8a, a discharge valve 8b which is brought into and out of contact with the discharge valve seat 8a, and a discharge valve spring 8c that urges the discharge valve 8b toward the discharge valve seat 8a. According to this discharge valve mechanism 8, the internal pressure of the pressurizing chamber 11 is higher than the pressure on the side of the discharge passage 12 downstream of the discharge valve 8b, and when overriding the drag force defined by the discharge valve spring 8c, the discharge valve 8b opens and pressurized fuel is pumped from the pressurizing chamber 11 to the discharge passage 12.

The units constituting the electromagnetic suction valve 300 of FIG. 2 are as follows. Reference numeral 30 denotes a suction valve. Reference numeral 35 denotes a rod which controls the position of the suction valve 30. Reference numeral 36 denotes an anchor unit. Reference numeral 33 denotes a suction valve spring. Reference numeral 40 denotes a rod urging spring. Reference numeral 41 denotes an anchor unit urging spring. According to this mechanism, the suction valve 30 is urged to the closing valve direction by the suction valve spring 33 and urged to the opening valve direction via the rod 35 by the rod urging spring 40. The anchor unit 36 is urged to the closing valve direction by the anchor unit urging spring. The valve position of the suction valve 30 is controlled by driving the rod 35 with the electromagnetic coil 43.

As described above, in the high-pressure fuel supply pump 1, the electromagnetic coil 43 in the high-pressure fuel supply pump main body 1 is controlled by the control signal S2 which the engine control unit 27 gives to the electromagnetic suction valve 300, and the fuel flow rate is discharged so that the fuel pumped to the common rail 23 via the discharge valve mechanism 8 attains a desired supply fuel.

In the high-pressure fuel supply pump 1, the pressurizing chamber 11 and the common rail 23 are in communication with each other by the relief valve 100. The relief valve 100 is a valve mechanism arranged in parallel with the discharge valve mechanism 8. When the pressure on the side of the common rail 23 rises to be equal to or more than the set pressure of the relief valve 100, the relief valve 100 opens and the fuel is returned into the pressurizing chamber 11 of the high-pressure fuel supply pump 1, so that this prevents abnormal high-pressure state in the common rail 23.

The relief valve 100 forms a high-pressure flow path 110 for allowing the discharge passage 12 on the downstream side of the discharge valve 8b in the high-pressure fuel supply pump main body 1 and the pressurizing chamber 11 to be in communication with each other, and is provided so as to bypass the discharge valve 8b here. The high-pressure flow path 110 is provided with a relief valve 102 that limits the flow of fuel to only one direction from the discharge flow path to the pressurizing chamber 11. The relief valve 102 is pressed against the relief valve seat 101 by a relief spring 105 that generates a pressing force. When the pressure difference between the pressurizing chamber 11 and the high-pressure flow path 110 becomes equal to or higher than the specified pressure defined by the relief spring 105, the relief valve 102 is configured to leave the relief valve seat 101 and to open the valve.

As a result, in the case where the common rail 23 becomes abnormally high-pressure due to malfunction of the electromagnetic suction valve 300 of the high-pressure fuel supply pump 1, and when the differential pressure between the discharge flow path 110 and the pressurizing chamber 11 becomes equal to or higher than the opening valve pressure of the relief valve 102, the relief valve 102 is opened, so that the abnormally high-pressure fuel is returned from the discharge flow path 110 to the pressurizing chamber 11, and the high-pressure part piping such as the common rail 23 is protected.

FIG. 1 is a diagram showing a specific example of a high-pressure fuel supply pump main body 1 constructed mechanically as a unit. According to this figure, a plunger 2 for performing a reciprocating motion (in this case, up and down movement) by a cam mechanism (not shown) of the engine is arranged in a cylinder 6 in the height direction in the center of the figure, and a pressurizing chamber 11 is formed in the cylinder 6 above the plunger.

Figure 3:
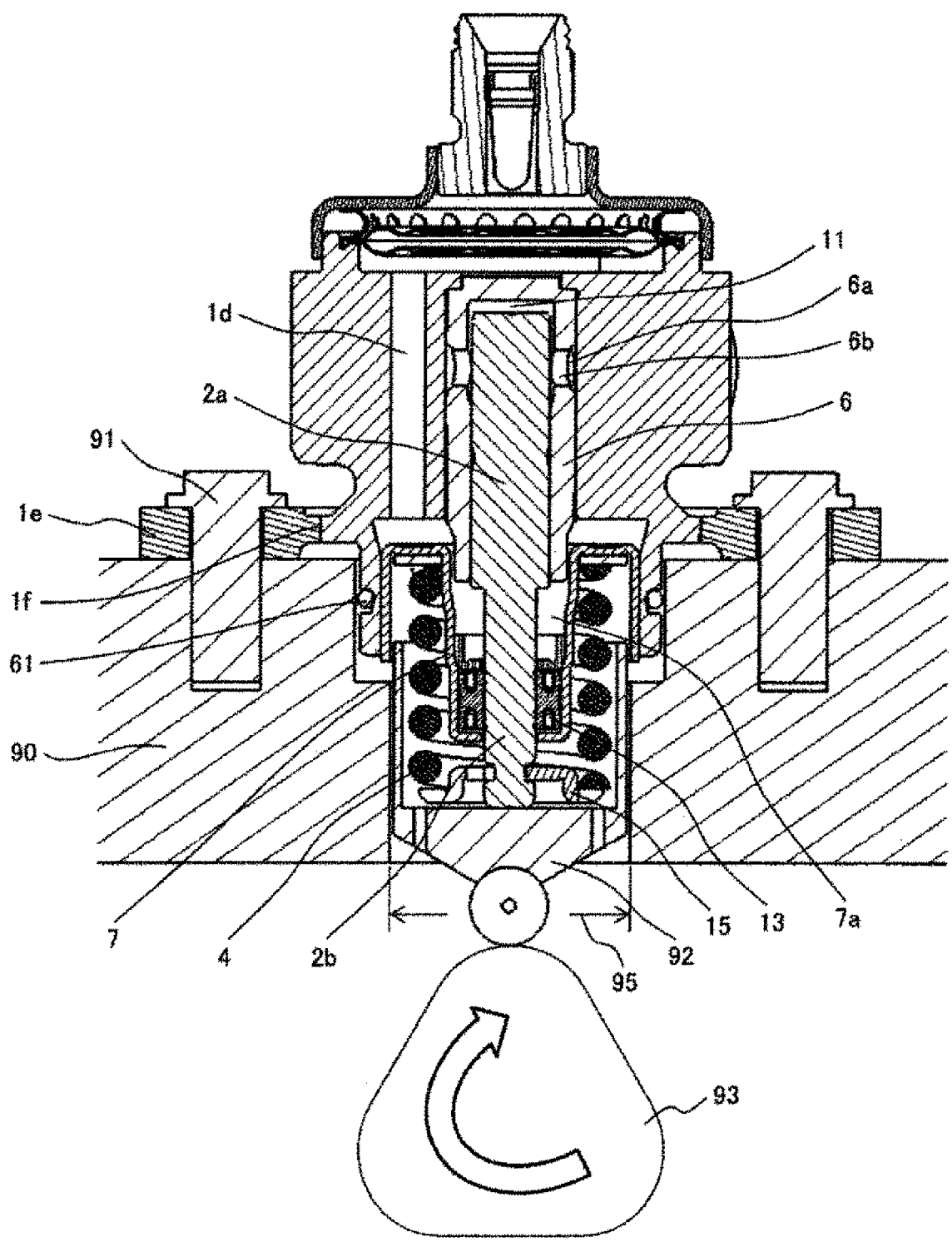
FIG. 3 is a cross-sectional view of the high-pressure fuel supply pump according to the first embodiment of the present invention.

According to this figure, a mechanism on the side of the electromagnetic suction valve 300 is disposed at the left side of the center of the figure, and a discharge valve mechanism 8 is disposed at the right side of the center of the figure. In the upper part of the figure, the low-pressure fuel suction port 10a, the pressure pulsation reduction mechanism 9, the suction passage 10d, and the like are arranged as a mechanism on the fuel suction side. Furthermore, a mechanism 150 on the plunger internal combustion engine side is described in the lower part of the center of FIG. 1. Since the mechanism 150 on the plunger internal combustion engine side is a portion embedded and fixed in the internal combustion engine main body as shown in FIG. 3, the mechanism 150 will be referred to as a mounting base portion here. Note that the relief valve 100 mechanism is not shown in the display section of FIG. 1. Although the relief valve 100 mechanism can be displayed in the display section of another angle, it is not directly related to the present invention, and therefore, explanation and indication thereabout are omitted.

Detailed explanation of each unit of FIG. 2 will be described later. First, FIG. 3 explains the mounting of the mounting base portion. FIG. 3 shows a state in which a mounting base portion (plunger internal combustion engine-side mechanism) 150 is embedded in the internal combustion engine main body and fixed. In FIG. 3, however, a mounting base portion 150 is mainly described, and therefore, description of other parts is omitted. In FIG. 3, reference numeral 90 denotes the thick portion of the cylinder head of the internal combustion engine. In the cylinder head 90 of the internal combustion engine, a mounting base portion attachment hole 95 is formed in advance. The mounting base portion attachment hole 95 has two steps of diameters according to the shape of the mounting base portion 150, and the mounting base portion 150 is fitted in the base portion attachment hole 95. Besides, the mounting base portion 150 is airtightly fixed to the cylinder head 90 of the internal combustion engine. In the airtight fixed arrangement example of FIG. 3, the high-pressure fuel supply pump closely adheres to the plane of the cylinder head 90 of the internal combustion engine using the flange 1e provided in the pump main body 1 and is fixed by a plurality of bolts 91. In addition, the attachment flange 1e is welded to the pump main body 1 at the welded portion 1f to form an annular fixed part. In the present embodiment, laser welding is used for welding the welded portion 1f. In order to seal between the cylinder head 90 and the pump main body 1, an O-ring 61 is fitted into the pump main body 1 to prevent the engine oil from leaking to the outside.

The plunger base portion 150 thus arranged in an airtight fixed manner converts the rotational motion of the cam 93 attached to the cam shaft of the internal combustion engine into the vertical motion at a lower end 2b of the plunger 2, and a tappet 92 for transmitting to the plunger 2 is provided. The plunger 2 is crimped to the tappet 92 at the spring 4 via the retainer 15. As a result, the plunger 2 is reciprocated up and down along with the rotational motion of the cam 93.

The plunger seal 13 held at the inner periphery lower end portion of the seal holder 7 is installed slidably in contact with the outer periphery of the plunger 2 at the lower part of the cylinder 6 in the figure, and the fuel in the annular low-pressure fuel chamber 7a is structured to be sealable even when the plunger 2 slides, and this prevents fuel from leaking to the outside. At the same time, this prevents lubricating oil (including engine oil) that lubricates the sliding unit in the internal combustion engine from flowing into the inside of the pump main body 1.

In the plunger base portion 150 airtightly fixed as shown in FIG. 3, the plunger 2 in the plunger base portion 150 reciprocates in the cylinder 6 as the internal combustion engine rotates. The operation of each unit accompanying this reciprocating motion will be explained back to FIG. 1. In FIG. 1, the cylinder 6 having an end portion (upper side in FIG. 1) formed into a bottomed tubular shape is attached to the high-pressure fuel supply pump main body 1, so as to guide the reciprocating motion of the plunger 2 and form a pressurizing chamber 11 therein. Further, the pressurizing chamber 11 is provided with an annular groove 6a on the outer peripheral side and a plurality of communication holes 6b communicating the annular groove 6a and the pressurizing chamber, so as to communicate with the electromagnetic suction valve 300 for supplying fuel and the discharge valve mechanism 8 for discharging fuel from the pressurizing chamber 11 to the discharge passage.

The outer diameter of the cylinder 6 is press-fitted and fixed with the high-pressure fuel supply pump main body 1, and is sealed with the cylindrical surface of the press-fit portion so that the pressurized fuel does not leak to the low-pressure side through the gap between the cylinder 6 and the high-pressure fuel supply pump main body 1. A small diameter portion 6c is provided on the pressurizing chamber side outer diameter of the cylinder 6. As the fuel in the pressurizing chamber 11 is pressurized, a force acts on the cylinder 6 toward the low-pressure fuel chamber 10c. However, by providing a small diameter portion 1a in the pump main body 1, it prevents the cylinder 6 from falling out to the low-pressure fuel chamber 10c. The faces thereof are brought into contact with each other with the plane in the axial direction. As a result, not only the sealing of the contact cylindrical surface of the high-pressure fuel supply pump main body 1 and the cylinder 6 but also the function of the double seal are achieved.

A damper cover 14 is fixed to the head of the high-pressure fuel supply pump main body 1. A suction joint 51 is provided on the damper cover 14 to form the low-pressure fuel suction port 10*a*. The fuel that has passed through the low-pressure fuel suction port 10*a* passes through the filter 52 fixed inside the suction joint 51, and reaches the suction port 31*b* of the electromagnetic suction valve 300 via the pressure pulsation reduction mechanism 9 and the low-pressure fuel flow path 10*d*.

The suction filter 52 in the suction joint 51 serves to prevent foreign matter present between the fuel tank 20 and the low-pressure fuel suction port 10*a* from being absorbed into the high-pressure fuel supply pump by the flow of fuel.

The plunger 2 has the large diameter portion 2*a* and the small diameter portion 2*b*, so that the volume of the annular low-pressure fuel chamber 7*a* is increased or decreased by the reciprocating movement of the plunger. The increase and decrease of the volume is made as follows: the annular low-pressure fuel chamber 7*a* is in communication with the low-pressure fuel chamber 10 through the fuel passage 1*d* (FIG. 3), and when the plunger 2 descends, a flow of fuel is generated from the annular low-pressure fuel chamber 7*a* to the low-pressure fuel chamber 10, when the plunger 2 ascends, a flow of fuel is generated from the low-pressure fuel chamber 10 to the annular low-pressure fuel chamber 7*a*. This makes it possible to reduce the fuel flow rate into and out of the pump in the suction step or return step of the pump, so that a function to reduce pulsation is provided.

A pressure pulsation reduction mechanism 9 is installed in the low-pressure fuel chamber 10 to reduce the pressure pulsation generated in the high-pressure fuel supply pump from spreading into the fuel pipe 28 (FIG. 2). In a case where the fuel once flowed into the pressurizing chamber 11 is returned to the suction passage 10*d* (suction port 31*b*) through the suction valve body 30 in the opening valve state again due to the capacity control, the fuel returned to the suction passage 10*d* (suction port 31*b*) generates pressure pulsation in the low-pressure fuel chamber 10. However, the pressure pulsation reduction mechanism 9 provided in the low-pressure fuel chamber 10 is formed by bonding two disc-shaped metal plates in a corrugated form at the outer periphery thereof and formed with a metal damper into which an inert gas such as argon is injected. The pressure pulsation is absorbed and reduced by this metal damper expanding and contracting. Reference numeral 9*b* denotes a mounting bracket for fixing the metal damper to the inner periphery of the high-pressure fuel supply pump main body 1, and is installed on the fuel passage. Therefore, a plurality of holes are provided so that the fluid can freely go to and from the front and back of the mounting bracket 9*b*.

The discharge valve mechanism 8 provided in the exit of the pressurizing chamber 11 is constituted by a discharge valve seat 8*a*, a discharge valve 8*b* which is brought into and out of contact with the discharge valve seat 8*a*, a discharge valve spring 8*c* which urges the discharge valve 8*b* toward the discharge valve seat 8*a*, and a discharge valve holder 8*d* accommodating the discharge valve 8*b* and the discharge valve seat 8*a*. The discharge valve seat 8*a* and the discharge valve holder 8*d* are welded together at a contact portion 8*e* to form an integral discharge valve mechanism 8. A stepped portion 8*f* forming a stopper for regulating the stroke of the discharge valve 8*b* is provided inside the discharge valve holder 8*d*.

In FIG. 1, when there is no pressure difference between the pressurizing chamber 11 and the fuel discharge port 12, the discharge valve 8*b* is pressed against the discharge valve seat 8*a* by the urging force of the discharge valve spring 8*c* and is in the closing valve state. Only after the fuel pressure of the pressurizing chamber 11 becomes larger than the fuel pressure of the fuel discharge port 12, the discharge valve 8*b* opens against the discharge valve spring 8*c*, and the fuel in the pressurizing chamber 11 is discharged to the common rail 23 via the fuel discharge port 12. When the discharge valve 8*b* is opened, it comes into contact with the discharge valve stopper 8*f*, and the stroke is restricted. Therefore, the stroke of the discharge valve 8*b* is appropriately determined by the discharge valve stopper 8*d*. As a result, this prevents the fuel discharged with high pressure to the fuel discharge port 12, with the closing delay of the discharge valve 8*b* when the stroke is too large, from flowing back into the pressurizing chamber 11, and can suppress reduction in the efficiency of the high-pressure fuel supply pump. When the discharge valve 8*b* repeats the opening valve and closing valve movements, the discharge valve 8*b* guides on the inner circumferential surface of the discharge valve holder 8*d* so as to move only in the stroke direction. As a result, the discharge valve mechanism 8 becomes a check valve that limits the flow direction of fuel.

Figure 4:
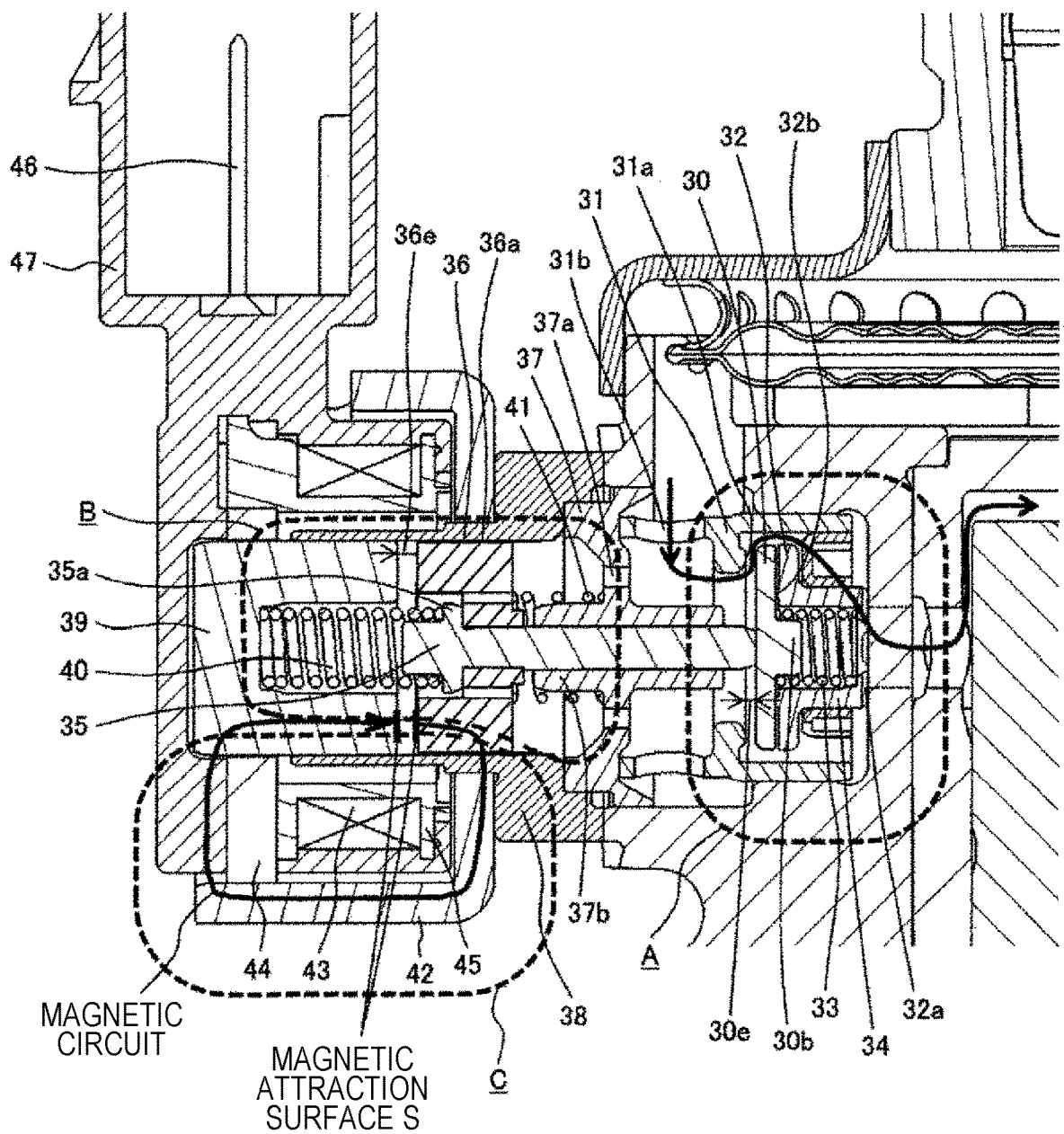
FIG. 4 is a sectional view of a solenoid valve in a suction step in the high-pressure fuel supply pump according to the first embodiment of the present invention.
Figure 5:
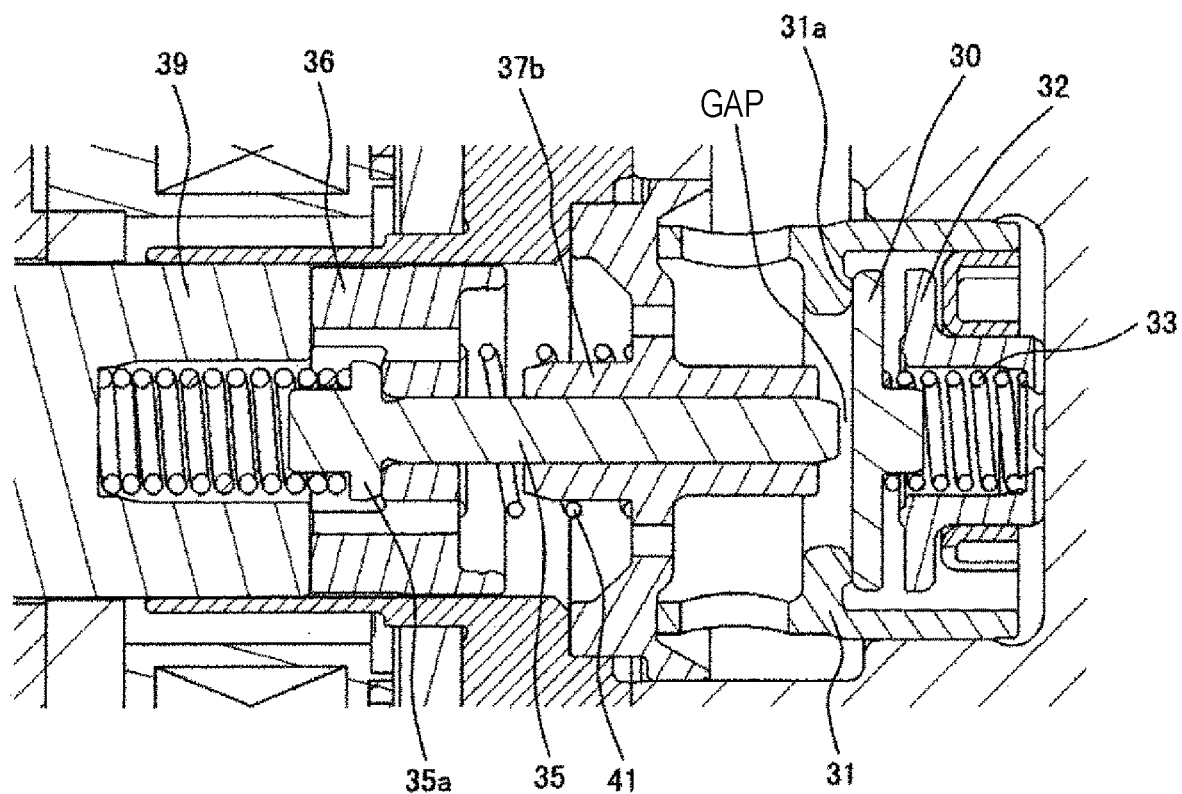
FIG. 5 is a sectional view of the solenoid valve in a discharge step with energization in the high-pressure fuel supply pump according to the first embodiment of the present invention.
Figure 6:
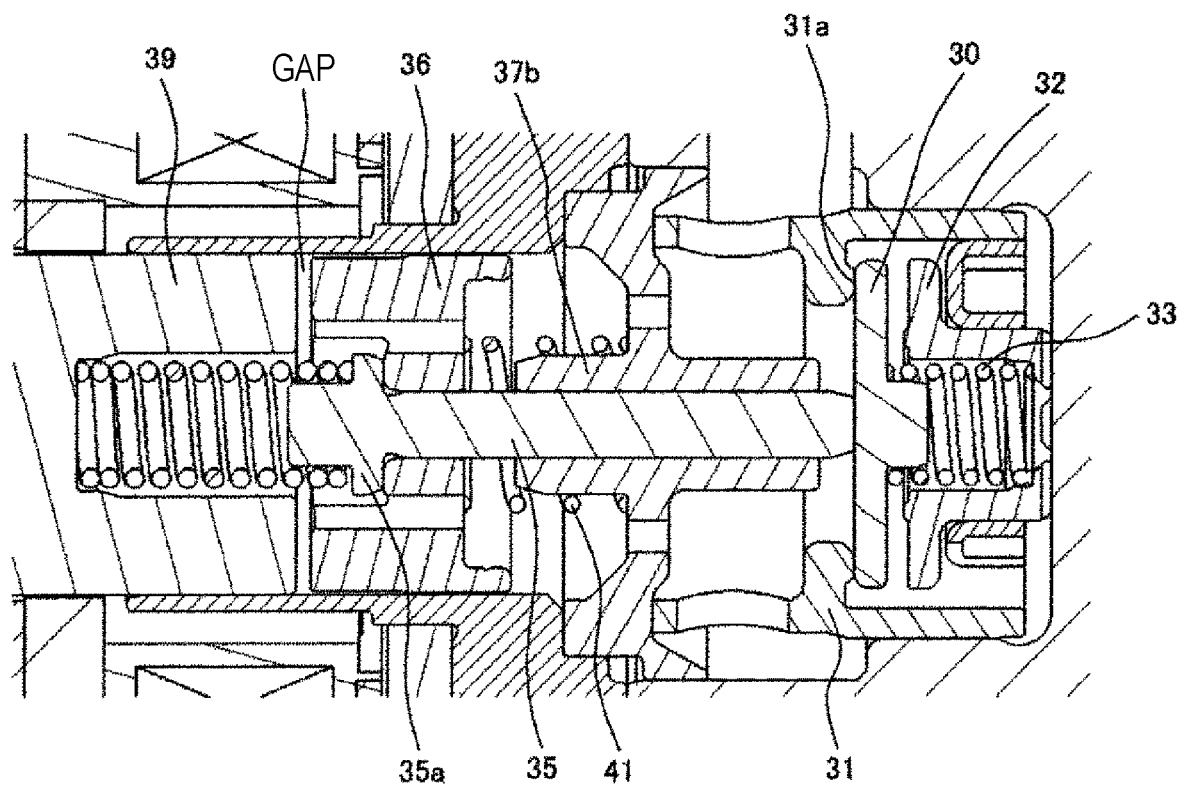
FIG. 6 is a cross-sectional view of the solenoid valve in the discharge step without energization in the high-pressure fuel supply pump according to the first embodiment of the present invention.

Next, the structure at the electromagnetic suction valve 300 which is the main part of the present invention will be explained with reference to FIG. 4, FIG. 5, and FIG. 6. It is to be noted that FIG. 4 shows the state in the suction step among the suction, return, and discharge steps in the pump action. FIG. 5, FIG. 6 shows the state in the discharge step. First, the structure on the electromagnetic suction valve 300 side will be explained with reference to FIG. 4. The structure at the electromagnetic suction valve 300 will be explained by roughly separating into a suction valve unit A composed mainly of the suction valve 30, a solenoid mechanism unit B mainly composed of the rod 35 and the anchor unit 36, and a coil unit C mainly composed of the electromagnetic coil 43.

First, the suction valve unit A is constituted by a suction valve 30, a suction valve seat 31, a suction valve stopper 32, a suction valve urging spring 33, and a suction valve holder 34. Among them, the suction valve seat 31 is cylindrical, and includes a seat unit 31*a* at the inner circumferential side axial direction and one or more suction passage units 31*b* radially around the axis of the cylinder, and with its outer cylindrical surface being pressed and held into the high-pressure fuel supply pump main body 1.

The suction valve holder 34 has two or more directional claws radially. The outer peripheral side of the claw of the suction valve holder 34 is coaxially fitted and held on the inner peripheral side of the suction valve seat 31. Further, the suction stopper 32 having a cylindrical shape and having a flange shape at one end portion is press-fitted and held on the inner peripheral cylindrical surface of the suction valve holder 34.

The suction valve urging spring 33 is configured to be disposed on the inner peripheral side of the suction valve stopper 32 in a small diameter portion for partially coaxially stabilizing one end of the spring, and the suction valve 30 is configured such that the suction valve urging spring 33 is engaged with the valve guide unit 30*b* between the suction valve seat unit 31*a* and the suction valve stopper 32. The suction valve urging spring 33 is a compression coil spring.

The urging force acts on the direction in which the suction valve 30 is pressed against the suction valve seat unit 31a. The suction valve urging spring 33 is not limited to the compression coil spring, so long as it can obtain the urging force. The suction valve urging spring 33 may be like a plate spring having an urging force integrated with the suction valve.

The suction valve unit A is configured as described above, so that, in the suction step of the pump, the fuel that has passed through the suction passage 31b to enter thereinto passes between the suction valve 30 and the seat unit 31a, passes between the outer circumferential side of the suction valve 30 and the claw of the suction valve holder 34, passes through the high-pressure fuel supply pump main body 1 and the passage of the cylinder, thus causing the fuel flow into the pump chamber. In the discharge step of the pump, the suction valve 30 is contact-sealed with the suction valve seat unit 31a, so that this achieves the function of a check valve that prevents backflow of fuel to the inlet port side.

In order to smooth the movement of the suction valve 30, a passage 32a is provided to release the fluid pressure on the inner peripheral side of the suction valve stopper according to the movement of the suction valve 30.

A movement amount 30e in the axial direction of the suction valve 30 is restricted to a finite extent by the suction valve stopper 32. This is because when the movement amount is too large, the backward flow amount increases due to the response delay when closing the suction valve 30, and the performance as pump deteriorates. This movement amount restriction can be defined by the shape dimension of the axial direction of the suction valve seat 31a, the suction valve 30, the suction valve stopper 32, and the press-fit position.

An annular protrusion 32b is provided in the suction valve stopper 32 and the contact area with the suction valve stopper 32 is reduced in a state where the suction valve 32 is in an opening valve state. This is to make it easier for the suction valve 32 to separate from the suction valve stopper 32 when transitioning from the opening valve state to the closing valve state, i.e., for improving closing valve responsiveness. In the absence of the annular protrusion, that is, when the contact area is large, a large squeezing force acts between the suction valve 30 and the suction valve stopper 32, and the suction valve 30 becomes difficult to separate from the suction valve 32.

The suction valve 30, the suction valve seat 31a, and the suction valve stopper 32 repeat collisions at the time of mutual action, and are therefore of a material treated with heat treatment to martensitic stainless steel which is high in strength, high in hardness, and also excellent in corrosion resistance. For the suction valve spring 33 and the suction valve holder 34, an austenitic stainless steel material is used in consideration of corrosion resistance.

Next, the solenoid mechanism unit B will be described. The solenoid mechanism unit B includes a rod 35 and an anchor unit 36 which are movable units; a rod guide 37, an outer core 38, and a fixed core 39 which are fixed units; and a rod urging spring 40 and an anchor unit urging spring 41.

The movable unit rod 35 and the anchor unit 36 are constructed as separate members. The rod 35 is slidably held in the axial direction on the inner peripheral side of the rod guide 37. The inner peripheral side of the anchor unit 36 is held slidably on the outer peripheral side of the rod 35. That is, both the rod 35 and the anchor unit 36 are configured to be slidable in the axial direction within a range geometrically restricted.

In order to freely and smoothly move in the axial direction in the fuel, the anchor unit 36 has one or more through holes 36a penetrating in the axial direction of the part, and the anchor unit 36 eliminates, as much as possible, the restriction in the movement with a pressure difference before and after the anchor unit.

In the diameter direction, the rod guide 37 is inserted on the inner peripheral side of the hole into which the suction valve of the high-pressure fuel supply pump main body 1 is inserted, and in the axial direction, the rod guide 37 abuts against one end of the suction valve seat. The rod guide 37 is arranged to be sandwiched between the outer core 38 welded and fixed to the high-pressure fuel supply pump main body 1 and the high-pressure fuel supply pump main body 1. Similarly to the anchor unit 36, the rod guide 37 is provided with a through hole 37a penetrating in the axial direction, so that, in order to allow the anchor unit to move freely, the pressure of the fuel chamber on the anchor unit side is configured not to disturb the movement of the anchor unit.

With the outer core 38, the shape opposite to the portion welded to the high-pressure fuel supply pump main body is a thin-walled cylindrical shape, and the welding and fixing is made in the form that the fixed core 39 is inserted on the inner peripheral side. The rod urging spring 40 is arranged on the inner peripheral side of the fixed core 39 and a small diameter portion is arranged as a guide, and the rod 35 comes into contact with the suction valve 30. An urging force is given in the direction in which the suction valve separates from the suction valve seat unit 31a, i.e., in the opening valve direction of the suction valve.

The anchor unit urging spring 41 is arranged so that while the end is inserted into the cylindrical center bearing portion 37b provided on the center side of the rod guide 37 and the same axis is maintained, the urging force is applied in the direction of the rod collar portion 35a to the anchor unit 36. The movement amount 36e of the anchor unit 36 is set larger than the movement amount 30e of the suction valve 30. This is to surely close the suction valve 30.

The rod 35 and the rod guide 37 mutually slide, and the rod 35 repeatedly collides with the suction valve 30. Therefore, considering the hardness and corrosion resistance, martensitic stainless steel subjected to heat treatment is used. The anchor unit 36 and the fixed core 39 use magnetic stainless steel to form a magnetic circuit. For rod urging spring 40 and the anchor unit urging spring 41, austenitic stainless steel is used in consideration of corrosion resistance.

According to the above configuration, in the suction valve unit A and the solenoid mechanism unit B, three springs are organically arranged. The suction valve urging spring 33 configured in the suction valve unit A and the rod urging spring 40 and the anchor unit urging spring 41 configured in the solenoid mechanism unit B correspond thereto. In this embodiment, although any of the springs uses a coil spring, any configuration can be used as long as urging force can be obtained.

The relationship between these three spring forces is composed of the following formula.

Mathematical Formula 1

Rod urging spring 40 force>anchor unit urging spring 41 force+suction valve urging spring 33 force+force for closing suction valve with fluid   (1)

According to the relationship of the formula (1), when not energized, due to each spring force, the rod 35 acts as force f1 in the direction separating the suction valve 30 from the suction valve seat unit 31a, i.e., the direction in which the valve opens. From the formula (1), the force f1 in the direction in which the valve opens is expressed by the following formula (2).

Mathematical Formula 2

$$f1 = rod\ urging\ spring\ force - (anchor\ unit\ urging\ spring\ force + suction\ valve\ urging\ spring\ force + force\ for\ closing\ suction\ valve\ with\ fluid) \quad (2)$$

Finally, the configuration of coil unit C will be described. The coil unit C includes a first yoke 42, an electromagnetic coil 43, a second yoke 44, a bobbin 45, a terminal 46, and a connector 47. The coil 43 in which a copper wire is wound a plurality of times on the bobbin 45 is disposed so as to be surrounded by the first yoke 42 and the second yoke 44 and molded integrally and fixed with the connector which is a resin member. The two ends of each of the two terminals 46 are connected to both ends of the copper wire of the coil so as to be energizable. Similarly, the terminal 46 is molded integrally with the connector, and the remaining end is connectable to the engine control unit side.

In the coil unit C, the hole in the center of the first yoke 42 is pressed into the outer core 38 and fixed therein. At that time, the inner diameter side of the second yoke 44 comes into contact with the fixed core 39 or in proximity thereto with a slight clearance therebetween.

Both the first yoke 42 and the second yoke 44 are made of a magnetic stainless steel material in order to construct a magnetic circuit and in consideration of corrosion resistance. The bobbin 45 and the connector 47 are made of high strength heat resistant resin in consideration of strength property and heat resistance property. The coil 43 is made of copper, and the terminal 46 is made of brass plated with metal.

As described above, the solenoid mechanism unit B and the coil unit C are constructed, so that the magnetic circuit is formed by the outer core 38, the first yoke 42, the second yoke 44, the fixed core 39, and the anchor unit 36, as shown by the arrow portion in FIG. 4. When electric current is applied to the coil, magnetic attraction occurs between the fixed core 39 and the anchor unit 36, and a force that attracts each other is generated. In the outer core 38, the axial direction part where the fixed core 39 and the anchor unit 36 mutually generate magnetic attraction is formed as thin as possible, so that almost all of the magnetic flux passes between the fixed core 39 and the anchor unit 36, and therefore, magnetic attraction can be efficiently obtained.

When the magnetic attraction exceeds the force f1 in the direction in which the valve of the above formula (2) opens, anchor unit 36 as the movable unit is enabled to be attracted to the fixed core 39 together with the rod 35, and further, the core 39 and the anchor unit 36 come in contact with each other and the continuation of the contact is enabled.

According to the above configuration of the high-pressure fuel supply pump according to the present invention, the action is shown as follows in each step of suction, return, and discharge in the pump action.

First, the suction step will be explained. In the suction step, the plunger 2 moves in the direction of the cam 93 (plunger 2 descends) by the rotation of the cam 93 in FIG. 3. That is, the position of the plunger 2 is moving from the top dead center to the bottom dead center. For example, referring to FIG. 1, in the suction step state, the volume of the pressurizing chamber 11 increases and the fuel pressure in the pressurizing chamber 11 decreases. In this step, when the fuel pressure in the pressurizing chamber 11 becomes lower than the pressure of the suction passage 10d, the fuel passes through the suction valve 30 in the opening port state, passes through the communication hole 1b provided in the high-pressure fuel supply pump main body 1 and the cylinder outer passages 6a, 6b, and flows into the pressurizing chamber 11.

FIG. 4 shows the position relationship of each unit on the side of the electromagnetic suction valve 300 in the suction step, and therefore explanation is made with reference to FIG. 4. In this state, the electromagnetic coil 43 is maintained in the non-energized state, and the magnetic urging force is not exerted. Therefore, the suction valve 30 is pressed against the rod 35 by the urging force of the rod urging spring 40, and the suction valve 30 remains open.

Next, the return step will be described. In the returning step, the plunger 2 moves in the upward direction by the rotation of the cam 93 in FIG. 3. In other words, the position of the plunger 2 starts moving from the bottom dead center to the top dead center. At this time, the volume of the pressurizing chamber 11 decreases with compression motion after suction in plunger 2. However, in this state, the fuel once suctioned into the pressurizing chamber 11 is returned to the suction passage 10d again through the suction valve 30 in the opening valve state, and accordingly, the pressure of the pressurizing chamber never rise. This step is will be referred to as returning step.

In this state, when a control signal from the engine control unit 27 is applied to the electromagnetic suction valve 300, the process moves from the return step to the discharge step. When the control signal is applied to electromagnetic suction valve 300, magnetic attraction occurs in coil unit C, which acts on each unit. FIG. 5 shows the position relationship of each unit on the side of the electromagnetic suction valve 300 during magnetic attraction action, which will be explained with reference to FIG. 5. In this state, a magnetic circuit is formed by the outer core 38, the first yoke 42, the second yoke 44, the fixed core 39, and the anchor unit 36. When the electric current is applied to the coil, magnetic attraction occurs between fixed core 39 and anchor unit 36, and a force that attracts each other is generated. When the anchor unit 36 is attracted to the fixed core 39 which is a fixed unit, the rod 35 moves in a direction away from the suction valve 30 by the engagement mechanism of the anchor unit 36 and the rod collar portion 35a. At this time, the suction valve 30 is closed by the urging force by the suction valve urging spring 33 and the fluid force caused by the fuel flowing into the suction passage 10d. After closing valve, the fuel pressure of pressurizing chamber 11 rises with rising motion of plunger 2. When the fuel pressure of the pressurizing chamber 11 becomes equal to or higher than the pressure of the fuel discharge port 12, high-pressure discharge of fuel is performed via the discharge valve mechanism 8, and the fuel is supplied to the common rail 23. This step is referred to as a discharge step.

That is, the compression step of plunger 2 (rising step from the lower start point to the upper start point) is constituted by the return step and the discharge step. By controlling the energization timing of the electromagnetic suction valve 300 to the coil 43, it is possible to control the amount of high-pressure fuel to be discharged. When the timing to energize the electromagnetic coil 43 is advanced, the ratio of the return step during the compression step is small and the ratio of the discharge step is large. That is, the amount of fuel returned to the suction passage 10d is small, and the fuel to be discharged at high pressure is increased. On the other hand, when the energizing timing is delayed, the ratio of the return step during the compression step is large and the ratio of the discharge step is small. That is, much fuel is returned to the suction passage 10d, and the fuel to be discharged at high pressure is reduced. The energization timing to the electromagnetic coil 43 is controlled by a command from the engine control unit 27.

According to the configuration described above, by controlling the energization timing to the electromagnetic coil 43, the amount of fuel that is discharged at high pressure can be controlled to the amount required by the internal combustion engine.

FIG. 6 shows the position relationship of each unit on the side of the electromagnetic suction valve 300 in the discharge step. FIG. 6 shows a non-energized state in which the electromagnetic coil 43 is deenergized when the suction valve is closed after the pressure of the pump chamber has sufficiently increased. In this state, in preparation for the next cycle step, a system to effectively perform the next magnetic attraction generation and action is prepared. This structure is characterized by carrying out this system preparation.

Figure 7:
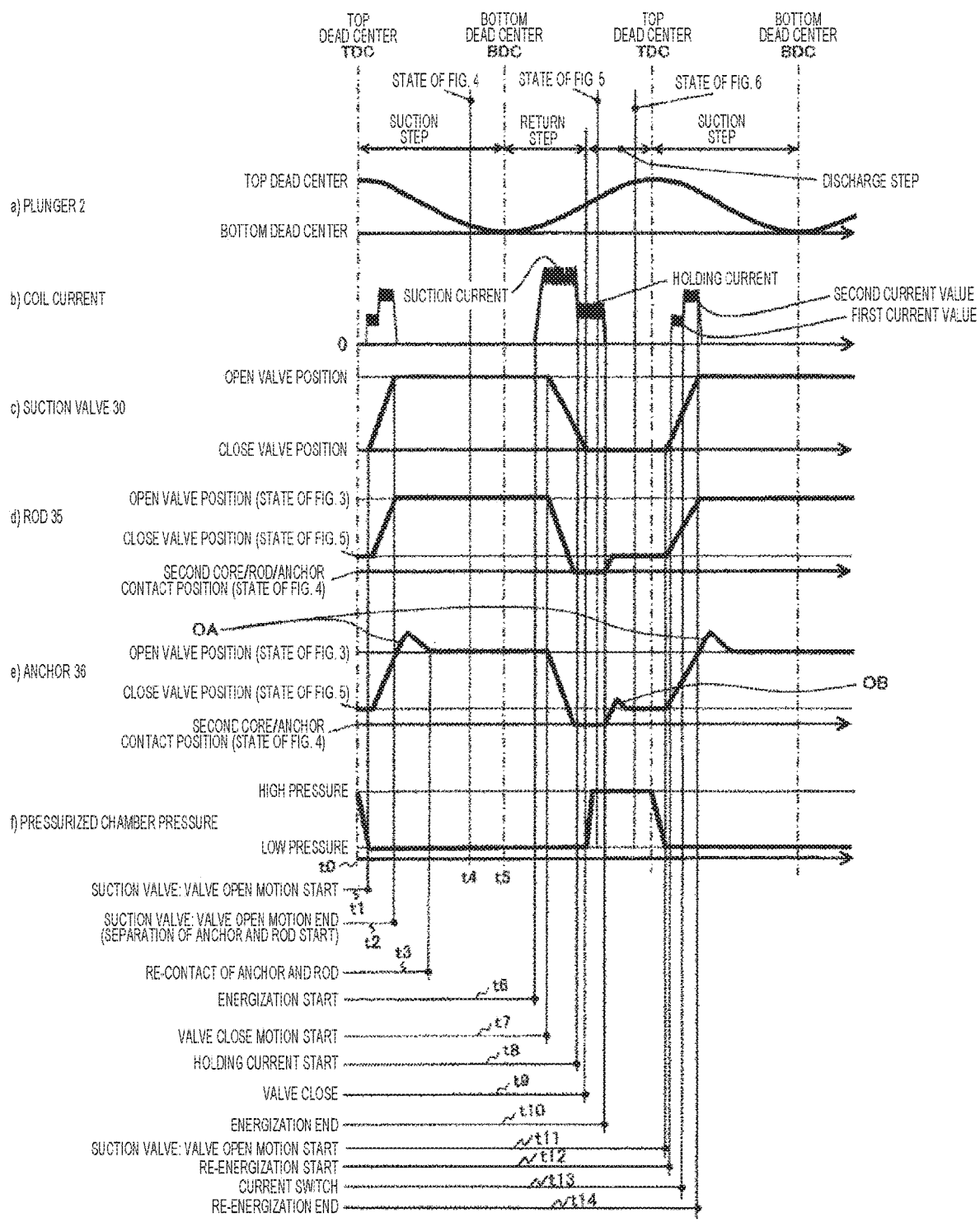
FIG. 7 is an operation timing chart of the solenoid valve in the high-pressure fuel supply pump according to the first embodiment of the present invention.

The timing chart of FIG. 7 shows, in order from above, a) the position of the plunger 2, b) the coil current, c) the position of the suction valve 30, d) the position of the rod 35, e) the position of the anchor unit 36, and f) the pressure in the pressurizing chamber. On the horizontal axis, each time t in the one cycle period returning from the suction step through the return step and the discharge step back to the suction step is displayed in chronological order.

According to a) the position of the plunger 2 in FIG. 7, the suction step is the period during which the position of plunger 2 ranges from top dead center to bottom dead center, and the period of the return step and the discharge step is the period during which the position of plunger 2 ranges from the bottom dead point to the top dead point. According to b) the coil current, in the suction step, once the suction current is passed through the coil, the energization is stopped, and furthermore, the suction current is passed through the coil in the return step, and subsequently, in a state where the holding current is flowing, the state proceeds to the discharge step. The current control according to the present invention will be explained in detail later.

Further, C) the position of the suction valve 30, d) the position of the rod 35, e) the position of the anchor unit 36 are such that each position changes corresponding to occurrence of magnetic attraction due to flow of b) the coil current, and returns to the original position at the beginning of suction step. In response to these position changes, f) the pressure in the pressurizing chamber becomes high pressure during the discharge step.

Hereinafter, the relationship between the operation of each unit in each step and each physical quantity at that time will be described. First, regarding suction step, when the plunger 2 begins to descend from top dead center at time t0, f) the pressure in the pressurizing chamber rapidly decreases from high-pressure state of 20 MPa level, for example. Along with this pressure decrease, the rod 35, the anchor unit 36, and the suction valve 30 start to move to the opening valve direction of the suction valve 30 at time t1 by the force f1 of the formula (2) described above in the valve opening direction. At time t2, the suction valve 30 is fully opened, and the rod 35 and the anchor unit 36 are in the opening valve position state of FIG. 3. As a result of the opening of the suction valve 30, the fuel flowing into the inner diameter side of the valve seat 31 from the passage 31b of the suction valve seat starts to be suctioned into the pressurizing chamber. During the initial movement of the suction step, the suction valve 30 collides with the suction valve stopper 32, and the suction valve 30 stops at that position. Likewise, the rod 35 also stops at the position where its tip contacts the suction valve 30 (opening valve position of the plunger rod in FIG. 7).

In contrast, the anchor unit 36 moves initially to the opening valve direction of the suction valve 30 at the same speed as the rod 35, but even after the time t2 when the rod 35 comes into contact with the suction valve 30 and stops, the anchor unit 36 tries to continue the movement with the inertial force. The portion indicated by OA in FIG. 7 is the area of this overshoot. At this time, the anchor unit urging spring 41 overcomes its inertia force and the anchor unit 36 moves again in the direction approaching the fixed core 39, and the anchor unit 36 can be stopped at the position (anchor unit opening valve position in FIG. 7) where the anchor unit 36 comes into contact with the rod collar portion 35a in a state where the anchor unit 36 is pressed against the rod collar portion 35a. The stop time of the anchor unit 36 due to re-contact of the rod 35 and the anchor unit 36 is indicated by t3. A state showing each position of the anchor unit 36, the rod 35, and the suction valve 30 at time t4 in the stable state after stop time t3 is shown in FIG. 4.

In the above description and in FIG. 7, it is explained that the rod 35 and the anchor unit 36 are completely separated from each other in the portion indicated by OA, but the rod 35 and the anchor unit 36 may be kept in contact with each other. In other words, the load acting on the contact unit between the rod collar portion 35a and the anchor unit 36 decreases after the movement of the rod is stopped, and when the load becomes zero, the anchor unit 36 starts to separate from the rod. Alternatively, it may be possible to configure a setting force of the anchor unit urging spring 41 in which the load does not become zero and a slight load is left. When the suction valve 30 collides with the suction valve stopper 32, an abnormal sound problem which is an important property as a product occurs. The magnitude of the abnormal noise is caused by the magnitude of the energy at the time of the collision. However, in the present invention, rod 35 and anchor unit 36 are constructed separately. Therefore, the energy colliding with the suction valve stopper 32 is generated only by the mass of the suction valve 30 and the mass of the rod 35. That is, the mass of the anchor unit 36 does not contribute to the collision energy. Therefore, by separately configuring the rod 35 and the anchor unit 36, the problem of abnormal noise can be reduced.

Even if the rod 35 and the anchor unit 36 are formed separately, when the anchor unit urging spring 41 is not provided, the anchor unit 36 continues to move to the opening valve direction of the suction valve 30 due to the inertial force, and collides with the center bearing portion 37b of the rod guide 37, so that a problem arises in that abnormal noise occurs at a portion different from the collision portion. In addition to the problem of abnormal noise, abrasion, deformation, and the like of the anchor unit 36 and the rod guide 37 occur by collision, and furthermore, metal abrasion causes metallic foreign matter and the foreign matter is caught in a sliding unit or seat unit, or it will deform and impair the bearing function, which result in impairing the function of the suction valve solenoid mechanism.

In the case of the configuration without the anchor unit urging spring 41, the anchor unit is too far from the core 39 due to the inertial force (OA section in FIG. 7), and there is a problem in that when a current is applied to the coil unit in order to transition from the return step to the discharge step, which is the later step as the operation time, the necessary magnetic attraction cannot be obtained. When necessary magnetic attraction cannot be obtained, a big problem arises in that the fuel to be discharged from the high-pressure fuel supply pump cannot be controlled to a desired flow rate.

Therefore, the anchor unit urging spring 41 has an important function to prevent the above problem from occurring.

After the suction valve 30 is opened, the plunger 2 further descends and reaches the bottom dead center (time t5). During this time, the fuel continues to flow into the pressurizing chamber 11, and this step is a suction step. The plunger 2 which descended to the bottom dead center enters the rising step and proceeds to the returning step.

At this time, the suction valve 30 remains stopped in the opening valve state with the force f1 in the direction in which the valve opens, and the direction of the fluid passing through the suction valve 30 is the opposite direction. That is, in the suction step, the fuel flows from the suction valve seat passage 31b into the pressurizing chamber 11, whereas at the time of the rising step, the fuel is returned from the pressurizing chamber 11 to the suction valve seat passage 31b. This step is the return step.

In this returning step, at the time of high engine speed, i.e., when the rising speed of the plunger 2 is high, the closing valve force of the suction valve 30 due to the returning fluid increases, and the force f1 in the direction in which the valve opens is small. Under this condition, when the setting force of each spring force is wrong and the force f1 in the direction in which the valve opens becomes negative value, the suction valve 30 will be unintentionally closed, and a flow rate larger than the desired discharge flow rate is discharged. As a result, the pressure in the fuel pipe rises above the desired pressure, adversely affecting the combustion control of the engine. Therefore, it is necessary to set each spring force so that the force f1 in the direction in which the valve opens maintains a positive value under the condition that the rising speed of the plunger 2 is the largest.

At the time t6 in the course of this returning step, the coil current is supplied, thereby creating the transition state from the returning step to the discharging step. In FIG. 7, t7 means the closing valve movement start time of the suction valve 30, t8 means holding current start time, t9 means the closing valve time of the suction valve 30, and t10 means energization end time.

In this case, when the electromagnetic coil 43 is supplied with current at a time earlier than the desired discharge time taking into consideration the occurrence delay of the magnetic attraction and the closing valve delay of the suction valve 30, the magnetic attraction works between anchor unit 36 and fixed core 39. A current of the magnitude necessary for overcoming force f1 in the direction in which the valve opens is required to be given. At time t7 when this magnetic attraction overcomes force f1 in the direction in which the valve opens, the anchor unit 36 starts moving in the direction of the fixed core 39. As the anchor unit 36 moves, the rod 35 contacting in the axial direction at the collar portion 35a also moves. The closing of the suction valve 30 is finished (time t9) due to the force of the suction valve urging spring 33 and the fluid force, mainly due to the decrease in the static pressure due to the flow velocity passing through the seat unit from the pressurizing chamber side.

In a case where, when the current is applied to the electromagnetic coil 43, the anchor unit 36 and the fixed core 39 are too far apart from the prescribed distance, i.e., the anchor unit 36 exceeds the "opening valve position" of FIG. 7 and the state of OA continues, the magnetic attraction is weak, and therefore, it is impossible to overcome the force f1 in the direction in which the valve opens. As a result, a problem arises in that it takes time to move the anchor unit 36 to the fixed core 39 or the anchor unit 36 cannot be moved.

To prevent this problem, the present invention has an anchor unit urging spring 41. When the anchor unit 36 cannot move to the fixed core 39 at a desired timing, the state where the suction valve 30 is opened is maintained even at the timing when it is desired to be discharged. For this reason, the discharge step cannot be started, that is, there is a concern that a desired engine combustion cannot be performed because the necessary discharge amount cannot be obtained. Therefore, the anchor unit urging spring 41 has an important function to prevent the abnormal noise problem that may occur in the suction step, and to prevent the problem in that the discharge step cannot started.

In FIG. 7, c) the suction valve 30 which started to move collides with the seat unit 31a and stops, thereby attaining the closing valve state. When c) the suction valve 30 is closed, the in-cylinder pressure rapidly increases, and accordingly, the suction valve 30 is firmly pressed in the closing valve direction by the in-cylinder pressure with a force much greater than the force f1 in the direction in which the valve opens, and starts maintaining the closing valve state.

e) the anchor unit 36 also collides with fixed core 39 and stops, and the rod 35 continues to move with inertial force even after the anchor unit 36 stop. However, the configuration is such that the rod urging spring 40 can be pushed back against the inertia force, and the collar portion 35a is configured to be able to return to the position where it contacts the anchor unit.

When the anchor unit 36 collides with the fixed core 39, an abnormal sound problem which is an important property as a product occurs. This abnormal noise is larger than the magnitude of the abnormal noise generated when the suction valve 30 and suction valve stopper 32 collide with each other, so this abnormal noise becomes a big problem. The magnitude of the abnormal noise is caused by the magnitude of the energy at the time of the collision. However, since the rod 35 and the anchor unit 36 are formed separately, the energy colliding with the fixed core 39 occurs only by the mass of the anchor unit 36. That is, the mass of the rod 35 does not contribute to the collision energy. Therefore, by separately configuring the rod 35 and the anchor unit 36, the problem of abnormal noise is reduced.

After the time t8 when the anchor unit 36 comes into contact with the fixed core 39, sufficient magnetic attraction occurs by contacting. Therefore, it is possible to attain a small current value (holding current) only for holding the contact.

Here, the current control of the present invention will be described in detail with reference to FIG. 7.

At the time t6, when energization to the coil is started, magnetic attraction occurs. At time t7 when the magnetic attraction overcomes the force f1 in the direction in which the valve opens, the anchor unit 36 starts moving to the fixed core 39. After passing a suction current for a certain time, it is switched to a holding current to maintain the state where fixed core 39 is in contact with anchor unit 36 at time t8. After that, the valve is closed at time t9, energizing is finished at time t10. However, it is known that an abnormal sound, or noise, is generated by collision at the time of abutment between the anchor unit 36 and the fixed core 39 when the valve is closed at time t9.

In order to reduce noise due to collision, it is necessary to reduce the collision energy. More specifically, as described above, reduction of the colliding mass by separating the rod unit 35 and the anchor unit 36 may be mentioned. It is also effective to narrow the distance between the anchor unit 36 and the fixed core 39, i.e., to narrow the gap, since the speed of the anchor unit 36 at the time of collision can be reduced.

Furthermore, the current control can be mentioned as a means for reducing the speed of the anchor unit 36 at the time of collision. This is a method to supply a relatively large suction current at the time of energization at time t6 as shown in the coil current waveform of FIG. 7, and switch the current to a current lower than the attraction current, for example, a holding current that can hold the closing valve state at time t8 before the anchor unit 36 collides with the fixed core 39. Alternatively, since the magnetic attraction is reduced, the moving speed of the anchor unit 36 can be reduced, and the collision energy, that is, the generated noise at the time of collision can be reduced.

Here, the waveform of the applied current is in two stages, the former half being larger and the latter half being lower than the former half. However, it may be possible to adopt a method in which a suction current is applied to start closing the valve at the time t6 at the start of energizing and before the anchor unit 36 and the fixed core 39 collide with each other, the current is switched to a current lower than the holding current and after the collision it is switched to the holding current.

When the energization is completed at the time t10 after closing the valve at the time t9, the magnetic attraction disappears, so the rod unit 35 is pushed by the rod urging spring 40 by the force f1 of the opening valve direction of the formula (2) described above so that the valve starts moving. In conjunction therewith, the anchor unit 36 also starts moving in the opening valve direction. Then, the anchor unit 36 and the rod unit 35 come into contact with the suction valve 30. Here, the anchor unit 36 slightly moves in the opening direction (OB) even after the rod unit 35 comes into contact with the suction valve 30 by inertia and then stops, but the anchor unit 36 stops at the same position as rod unit 35 by the anchor urging spring 41, and kept in that state for a while after contact. However, when the plunger 2 begins to descend by passing through the top dead center (TDC), the plunger 2 enters the suction step, and at time t11, the rod unit 35, the anchor unit 36, the suction valve 30 start to move together in the opening valve direction of the suction valve 30 by the force f1 in the direction in which the valve opens. The suction valve 30 comes into contact with the suction valve stopper 32, and the opening valve is completed.

Here, when the suction valve 30 and the suction valve stopper 32 are brought into contact with each other, abnormal noise or noises are generated due to a collision. Therefore, in the present invention, in order to reduce the noise caused by the collision, the current is applied again when opening valve.

In the control method of the high-pressure fuel supply pump including the suction valve 30 disposed on the suction side of the pressurizing chamber, the rod unit 35 for urging the suction valve 30 toward the opening valve direction, and the anchor unit 36 for moving the rod unit 35 in the closing valve direction by magnetic attraction caused by a solenoid being energized, when the anchor unit 36 moves in the opening valve direction, a first drive current is passed through the solenoid for a predetermined period of time, and thereafter a second drive current larger than the first drive current is passed through the solenoid for a predetermined period of time. In accordance with the above control, as the anchor moves in the opening valve direction, the first drive current flows through the solenoid for a predetermined period of time, and thereafter the second drive current larger than the first drive current flows through the solenoid for a predetermined period of time, and whereby the anchor makes electromagnetic attraction force in the closing valve direction.

At time t13, as shown in FIG. 7, the current value is switched to the second current value higher than the first current value. When energization to the solenoid is completed, the anchor unit 36 and the rod unit 35 move in the opening valve direction, and the rod unit 35 abuts and seats against the suction valve 30 and the suction valve stopper 32, and it is a problem that the collision sound is very large. Therefore, after the closing valve operation is completed, the electromagnetic coil 43 is energized again when the suction valve 30 is opened, so that the traveling speed of the rod 35 is braked. By energizing the electromagnetic coil 43, the speed at which the suction valve 30 collides with the suction valve stopper 32 is reduced, and as a result, the collision sound can be reduced. At the time of applying the second drive current, the anchor unit 36 and the rod unit 35 proceed in opposite directions to the fixed core 39, and the anchor unit 36 and the rod unit 35 move to positions where the electric current of the electromagnetic coil 43 hardly reaches than the time when the first drive current is applied. Therefore, it is necessary to apply a current larger than the first drive current to the second drive current. Here, in the present invention, it is considered that it is preferable that the current to be applied has a plurality of stages such as, for example, a two-step form, rather than a method of applying a single current such that a current value having a certain value is applied impulsively. The reasons are described below. In the case of application of a single shot, i.e., in the case where a comparatively small current, for example, a current smaller than the holding current, is applied, when it is applied at an earlier timing such as before the opening valve is started, the suction valve 30 is decelerated by magnetic attraction, but because the magnetic attraction is small, the effect of noise reduction at the time of collision is considered to be small, whereas when the current is applied at a later timing after the opening of the valve is started, the magnetic attraction generated is small, and therefore, it is considered that there is a possibility that the suction valve 30 cannot decelerate and abuts against the suction valve stopper 32, and the noise reduction effect may not be obtained.

As described above, this energization is performed by being divided into plural stages, for example, as in this embodiment, two stages, so that soft landing becomes possible.

Next, the anchor unit 36 is moved in the closing valve direction by passing the maximum drive current through the solenoid, and the first drive current is set to be smaller than the maximum drive current. Here, the maximum drive current means the attracting current referred to in FIG. 7, attracting the anchor unit 36 and rod 35 to the fixed core 39 side and applying a current with a relatively large current value to keep the closing valve state. Here, the first drive current starts to be energized at time t11 as shown in FIG. 7. In the first drive current, it is confirmed that when a large current flows as the anchor unit 36 is moved toward the opening valve direction, the suction valve 30 is pulled by the magnetic attraction and the opening of the valve does not occur. Therefore, it is necessary for the first drive current to pass a current smaller than the maximum drive current. By performing control as described above, the suction valve 30 can make soft landing on the suction valve stopper 32.

The anchor unit 36 is moved in the closing valve direction by passing the maximum drive current through the solenoid. Thereafter, a holding current smaller than the maximum drive current is caused to flow through the solenoid to hold the anchor unit 36 at the closing valve position, and the first drive current is set smaller than the holding current. Along with this movement, the anchor unit 36 is characterized by being held at the closing valve position.

The holding current is a current required to continue attracting the anchor unit 36 and the rod unit 35 toward the fixed core 39. After energization of the holding current is finished, the first drive current is supplied for the purpose of suppressing collision sound when the anchor unit 36 and the rod unit 35 collide with the suction valve and the suction valve stopper 32. In the first drive current, the first drive current is applied when the anchor unit 36 is moved in the opening valve direction. Therefore, it is confirmed a problem occurs in that when a large current is applied, the suction valve 30 is pulled by the magnetic attraction and the opening valve does not occur. Therefore, it is necessary for the first drive current to pass a current smaller than the maximum drive current. By performing control as described above, the suction valve 30 has a unique effect of being able to make soft landing on the suction valve stopper 32.

Next, the anchor unit 36 is moved in the closing valve direction by causing the maximum drive current to flow through the solenoid, a holding current smaller than the maximum drive current is caused to flow through the solenoid. This causes the anchor unit 36 to be held at the closing valve position, and the first drive current is smaller than the holding current, and the second drive current is equal to or higher than the holding current.

For example, it is conceivable that the first current is lower than the holding current and the second current is made higher than the holding current. When a two-stage current waveform such as this first low current value and later a high current value is applied, it is thought that this can reduce collision noise at opening valve. In the case where the current is not applied as in the conventional case, the electromagnetic excitation force is zero, and accordingly, the rod unit 35, the anchor unit 36, and the suction valve 30 start to accelerate integrally by the force f1 in the direction in which the valve opens. Although there is a possibility that the speed may be decelerated slightly due to internal fluid resistance or the like, it collides with the suction valve stopper 32 at a speed after being accelerated to a certain extent, and therefore, noise is generated.

As in the present invention, the current is applied again after the opening of the valve is started, so that magnetic attraction occurs, and the force is applied in the direction of the closing valve with respect to the force f1 in the direction in which the valve opens as described above, and therefore, braking can be applied. This makes it possible to reduce the speed of the rod unit 35, the anchor unit 36, and the suction valve 30 at the time of a collision, so that the noise at the time of collision can be reduced.

When the position of the plunger passes the top dead center, the operation to suck new fuel into the pressurizing chamber is started, and accordingly the operation of opening the suction valve 30 is started. When energizing of the solenoid for closing the suction valve 30 is terminated and energizing of the first current value for opening the suction valve 30 is started, the first drive current is passed through the solenoid after the top dead center. The first drive current is energized after top dead center. As a result, after finishing energization at time t10, the speed control can be naturally performed when the movement in the opening valve direction is started. That is, just before the suction valve 30 contacts the suction valve stopper 32, the current is applied to perform this. According to this control, it is possible to reduce abnormal noise generated when moving in the opening valve direction at appropriate timing.

In other words, the first drive current and the second drive current flow to the solenoid after the top dead center. In this embodiment, as shown in FIG. 7, the first drive current and the second drive current are the currents applied to reduce the impact sound at the opening valve of the suction valve 30. Therefore, it must be applied after the top dead center.

Next, the anchor unit 36 is moved in the closing valve direction by passing the maximum drive current through the solenoid, and the second drive current is set to be smaller than the maximum drive current. Along with this, the anchor is characterized by the action of the electromagnetic attractive force to the closing valve direction.

Here, the second drive current is a current that flows to suppress the speed at which the anchor unit 36 and the rod unit 35 collide with the suction valve stopper 32 when the suction valve 30 opens. The maximum drive current is a relatively large current that flows to close the suction valve 30. Applying a current as large as the maximum drive current as the second drive current should control the movement in the opening valve direction, but since it is attracted again by the magnetic attraction in the closing valve direction, the second drive current needs to be smaller than the maximum drive current.

The maximum drive current flows through the solenoid and the anchor unit 36 moves to the closing valve direction, and thereafter the drive current flowing through the solenoid decreases to move the anchor unit 36 in the opening valve direction. In the opening valve direction, the first drive current flows through the solenoid for a predetermined period of time, and thereafter, the second drive current larger than the first drive current flows through the solenoid for a predetermined period of time, and it is characterized by the action of the electromagnetic attractive force in the closing valve direction.

Subsequently, the anchor unit 36 is moved in the closing valve direction by flowing the maximum drive current through the solenoid. The first drive current and the second drive current are smaller than the maximum drive current. The maximum drive current of the suction valve 30 is a relatively large current applied to close the suction valve 30. When the rod unit 35 and the anchor unit 36 are present at the furthest position from the fixed core 39 receiving the current, it is necessary to perform move in the closing valve direction. Therefore, the maximum drive current needs to be the largest. Further, since the first drive current and the second drive current are the currents applied to reduce the impact sound that the suction valve 30 collides with the suction valve stopper 32 when the suction valve 30 opens, the first drive current and the second drive current are not required to be larger than the maximum drive current.

The first drive current flows through the solenoid after passing the holding current through the solenoid and then interrupting the drive current flowing through the solenoid. Then, the current is stopped in the completely opening valve state where the suction valve 30 and the suction valve stopper 32 are in contact with each other. At this time, it is preferable that the energization end timing for stopping the current is after the closing of the valve is completed. This is for the purpose that the anchor unit 36 and the rod unit 35 which had been moved in the closing valve direction by energizing the solenoid are naturally moved in the opening valve direction by cutting off the drive current, and a current is applied before the rod unit 35 moves to the suction valve 30 and the suction valve stopper 32, so that the collision sound is reduced. Also, by interrupting the current each time, it is possible to reduce fatigue of the fixed core 39, the anchor unit 36, and the rod unit 35.

When applying a relatively large current, for example, a current larger than the holding current, with a single application, and when applied at an earlier timing such as before starting the opening of the valve, the suction valve 30 is pulled by the magnetic attraction, and there is a possibility that it may return in the closing valve direction. When a current is applied at a later timing after the opening of the valve is started, there is a possibility that the suction valve 30 may abut against the suction valve stopper 32 before magnetic attraction occurs, that is, there is a possibility that the suction valve 30 abuts against the suction valve stopper 32 before deceleration.

When applying a relatively small current, for example, a current smaller than the holding current, with a single application, and when applied at an earlier timing such as before the opening of the valve is started, the suction valve 30 is decelerated by magnetic attraction, but because the magnetic attraction is small, the effect of noise reduction at the time of collision is considered to be small. When applied at a later timing after the opening of the valve is started, magnetic attraction generated is small. Therefore, it is considered that there is a possibility that the suction valve 30 cannot decelerate and abut against the suction valve stopper 32, and the noise reduction effect may not be obtained.

At the time t12 after the start of the opening of the valve as in the present invention, first, a relatively small first current value is applied such that the suction valve 30 does not return, for example, a current value smaller than the holding current is applied, so that the suction valve 30 is slightly braked. Next, at time t13, the current value is switched to a second current value larger than the above first current, for example, a current value larger than the holding current and is applied. As a result, it is possible to decelerate the suction valve 30 by further braking. By such control, it is thought that it is theoretically possible to set the speed of the suction valve 30 to zero by balance between magnetic attraction and f1 at the time when the valve is completely opened. Therefore, it is possible to reduce the collision sound due to the abutment between the suction valve 30 and the suction valve stopper 32.

The current waveform at the time of closing the suction valve 30 and the current waveform at the time of opening valve are set so as to be symmetrical similar waveform across the top dead center. The moving distance at the time of opening valve is the same as the moving distance when the valve is closed. For this reason, the currents applied to open the valve and to close the valve are characterized in that the currents have similar shapes. If the waveform of the current application when the valve is closed is determined, the waveform of the current application when the valve is opened is determined, so that the control step can be simplified.

Second Embodiment

Figure 8:
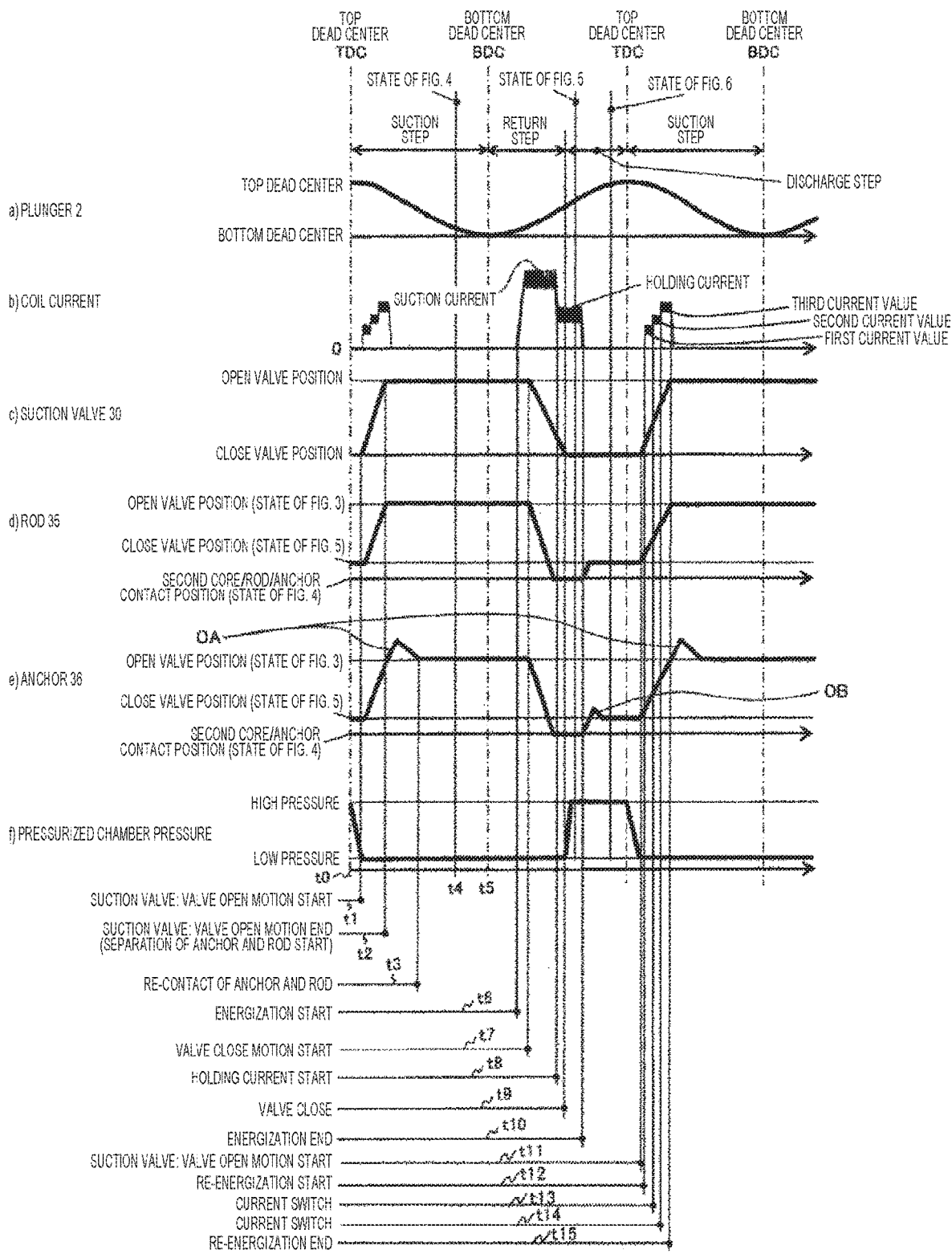
FIG. 8 is an operation timing chart of the solenoid valve in a high-pressure fuel supply pump according to a second embodiment of the present invention.

FIG. 8 shows a timing chart of a solenoid valve operation of a high-pressure fuel supply pump of the second embodiment. Except for b) the coil current in the figure, the second embodiment is the same as the first embodiment, and therefore, the explanation thereabout is omitted, and here, the reduction effect of abnormal noise or noises generated by the time waveform of the coil current will be explained.

As shown in the figure, the current waveform when moving from the opening valve to the closing valve is the same as that in FIG. 7. The current waveform when switching from closing valve to opening valve is different from FIG. 7, and is a three-stage waveform, i.e., a waveform for applying, firstly, a first current value of a low current, then a second current value higher than the first current value, and finally a third current value higher than the second current value. In this way, by setting the number of stages to two or more stages, it is possible to control the magnetic attraction by a more finely adjusted current. Therefore, it is possible to more carefully control the movement speed of the suction valve 30, and this enables soft landing that allows the speed of the suction valve 30 to be zero when the valve is fully opened.

As described above, the present invention is not limited to each of the above-described embodiments, and includes various modifications. For example, the above-described embodiments have been described in detail in order to explain the present invention in an easy-to-understand manner, and are not necessarily limited to those having all the configurations. Further, a part of the configuration of one embodiment can be replaced by a configuration of another embodiment, and a configuration of another embodiment can be added to a configuration of one embodiment. Further, it is possible to add, delete, and replace other configurations with respect to part of the configuration of each embodiment.

REFERENCE SIGNS LIST

1 pump main body
2 plunger
6 cylinder
7 seal holder
8 discharge valve mechanism
9 pressure pulsation reduction mechanism
10a low-pressure fuel suction port
11 pressurizing chamber
12 fuel discharge port
13 plunger seal
30 suction valve
31 suction valve seat
32 suction valve stopper
33 suction valve spring
35 rod
36 anchor unit
38 outer core
39 fixed core
40 rod urging spring
41 anchor unit urging spring
43 electromagnetic coil
300 electromagnetic suction valve
361 magnetic path forming unit
362 guide unit

The invention claimed is:

1. A control method of a fuel supply pump, comprising:
providing a suction valve disposed on a suction side of a pressurizing chamber, a rod for urging the suction valve toward an opening valve direction, and an anchor for moving the rod in a closing valve direction with attraction by magnetic attraction caused by a solenoid being energized;

moving an anchor in the closing valve direction by passing a maximum drive current through the solenoid, and thereafter holding the anchor at a closing valve position by passing a holding current for keeping a closing valve state through the solenoid, the holding current being smaller than the maximum drive current, wherein when the anchor moves in the opening valve direction, a first drive current is passed through the solenoid for a first predetermined period of time, and thereafter a second drive current larger than the first drive current is passed through the solenoid for a second predetermined period of time, and thereafter a third drive current larger than the second drive current is passed through the solenoid for a rd predetermined period of time so that an electromagnetic attraction force in the closing valve direction acts on the anchor, a current value of the first drive current is smaller than a current value of the holding current, a current value of the second drive current overlaps a range of the current value of the holding current, and a current value of the third drive current is equal to or more than the current value of the holding current, each of the first, second, and third drive currents have a continuous value for a given period of time, the first, second, and third drive current increase in value in a stepped fashion from the first drive current to the second drive current, to the third drive current, and a drive current passed through the solenoid does not exceed the second drive current in a time between the first predetermined period of time and the second predetermined period time.

2. The control method of the fuel supply pump according to claim 1,
wherein the first drive current is passed through the solenoid after a plunger reaches a top dead center position, the plunger pressurizing the fuel in the pressurizing chamber.

3. The control method of the fuel supply pump according to claim 1,
wherein the first drive current and the second drive current are passed through the solenoid after the plunger reaches a top dead center position, the plunger pressurizing the fuel in the pressurizing chamber.

4. The control method of the fuel supply pump according to claim 1,
wherein the anchor is moved in the closing valve direction by passing the maximum drive current through the solenoid, and
the second drive current is smaller than the maximum drive current.

5. The control method of the fuel supply pump according to claim 1,
wherein the holding current is passed through the solenoid, thereafter a drive current passed through the solenoid is cut off, and thereafter the first drive current is passed through the solenoid.

6. The control method of the fuel supply pump according to claim 1, wherein a current waveform at a time of closing the suction valve and a current waveform at a time of opening of the suction valve are set so as to be symmetrical waveforms relative to a time when the plunger reaches a top dead center position, the plunger pressurizing the fuel in the pressurizing chamber.

7. A fuel supply pump comprising:
a suction valve disposed on a suction side of a pressurizing chamber;
a rod for urging the suction valve toward an opening valve direction; and
an anchor for moving the rod in a closing valve direction with attraction by magnetic attraction caused by a solenoid being energized, wherein
the anchor is moved in the closing valve direction by passing a maximum drive current through the solenoid, and thereafter, the anchor is held at a closing valve position by passing a holding current for keeping a closing valve state through the solenoid, and the holding current is smaller than the maximum drive current,
when the anchor moves in the opening valve direction, a first drive current is passed through the solenoid for a first predetermined period of time, and thereafter a second drive current larger than the first drive current is passed through the solenoid for a second predetermined period of time, and thereafter a third drive current larger than the second drive current is passed through the solenoid for a third predetermined period of time, so that an electromagnetic attraction force in the closing valve direction is exerted,
a current value of the first drive current is smaller than a current value of the holding current, a current value of the second drive current overlaps a range of the current value of the holding current, and a current value of the third drive current is equal to or more than the current value of the holding current,
each of the first, second, and third drive currents have a continuous value for a given period of time,
the first, second, and third drive current increase in value in a stepped fashion from the first drive current to the second drive current, to the third drive current, and
a drive current passed through the solenoid does not exceed the second drive current in a time between the first predetermined period of time and the second predetermined period time.

* * * * *